July 5, 1938.    R. D. LACOE    2,122,817

ICE CREAM MAKING ATTACHMENT FOR MECHANICAL REFRIGERATORS

Filed July 2, 1935

INVENTOR
Ralph D. Lacoe
A.B.Bowman
ATTORNEY

Patented July 5, 1938

2,122,817

UNITED STATES PATENT OFFICE 2,122,817

ICE CREAM MAKING ATTACHMENT FOR MECHANICAL REFRIGERATORS

Ralph D. Lacoe, San Diego, Calif.

Application July 2, 1935, Serial No. 29,488

3 Claims. (Cl. 259—113)

My invention relates to attachments for stirring ice cream or the like while the cream or like substance is being frozen in mechanical refrigerators, and the primary object of my present invention is improvements over my ice cream making attachment for mechanical refrigerators, filed in the United States Patent Office September 26, 1934, Serial No. 745,579, patented Nov. 17, 1936, No. 2,061,077, and the objects of the improvements are:

First, to provide a shiftable paddle arrangement in which the paddle members rest on the bottom of the freezing receptacle and are guided by the bottom and sides of said receptacle;

Second, to provide a receptacle for freezing ice cream in mechanical refrigerators with a single central partition or dividing paddle;

Third, to provide a receptacle for mechanical refrigerators in which the upper edges of the ends of the receptacle as well as the partition are curved to aid in mixing the contents of the receptacle as well as keeping the contents from slopping out, thus eliminating any necessity for a cover for the receptacle;

Fourth, to provide an attachment of this class to which the operating arm is connected with a relatively long centrally positioned portion which prevents tilting of the shiftable paddles; and Fifth, to provide an ice cream making attachment for mechanical refrigerators that is very simple and economical of construction and operation, very efficient in its action, and which will not readily deteriorate or get out of order.

Figure 1:
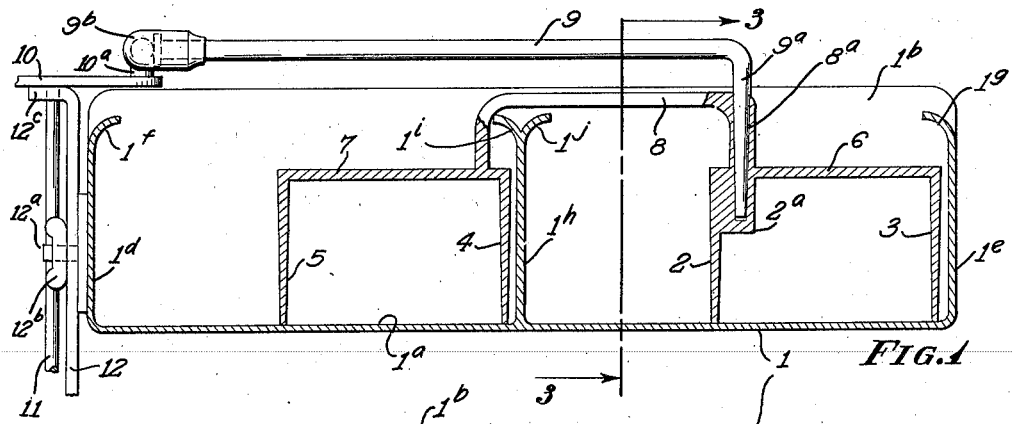
Figure 2:
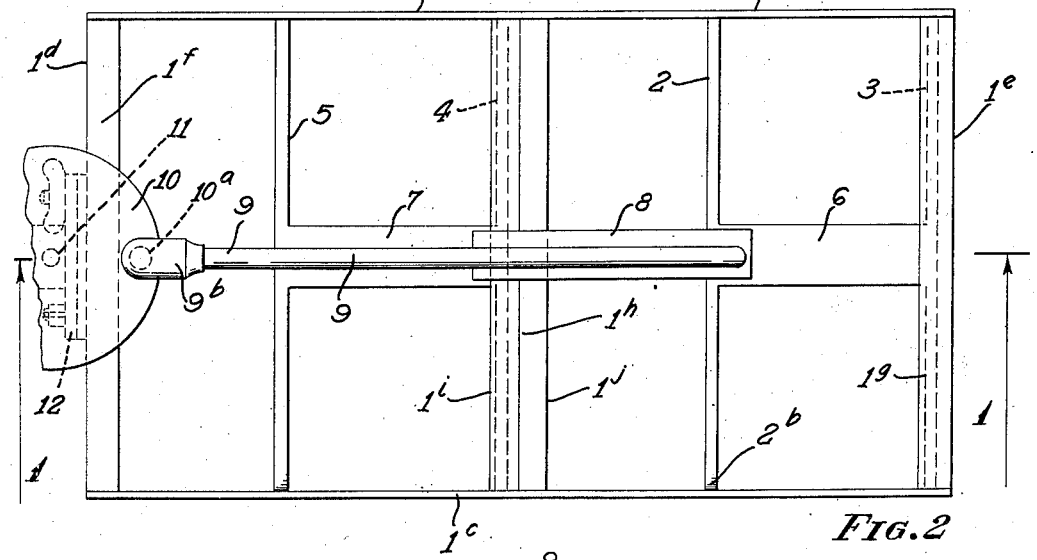
Figure 3:
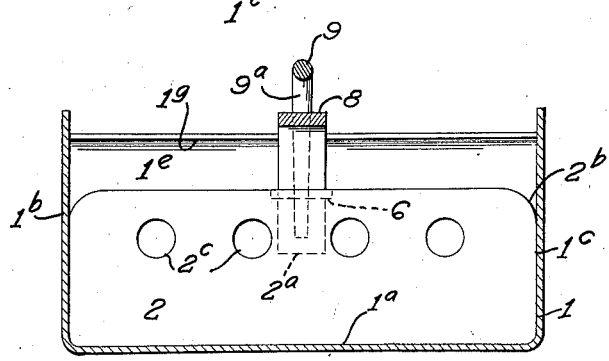

With these and other objects in view as will appear hereinafter, my invention consists of certain novel features of construction, combination and arrangement of parts and portions as will be hereinafter described in detail and particularly set forth in the appended claims, reference being had to the accompanying drawing and to the characters of reference thereon which form a part of this application, in which:

Figure 1 is a longitudinal sectional view of my attachment along the line 1—1 of Fig. 2 and showing some of the parts and portions in elevation to facilitate the illustration; Fig. 2 is a top or plan view thereof showing some of the parts and portions fragmentarily, and Fig. 3 is a transverse sectional view from the line 3—3 of Fig. 1.

Similar characters of reference refer to similar parts and portions throughout the several views of the drawing.

The freezing receptacle 1, shiftable paddle members 2, 3, 4 and 5, shiftable paddle member connecting bars 6, 7 and 8, pitman member 9, crank wheel 10, crank wheel shaft 11, and crank wheel support 12, constitute the principal parts and portions of my ice cream making attachment for mechanical refrigerators.

The receptacle 1 is preferably rectangular in shape, as shown, and is provided with a bottom 1a, sides 1b and 1c, and ends 1d and 1e. The end 1d is provided with an inwardly curved upper edge 1f, while the end 1e is provided with an inwardly curved upper edge 1g. Mounted intermediate the ends of the receptacle 1 and extending transversely therewith is a partition or stationary paddle member 1h which is provided with oppositely curved upper edges 1i and 1j; and it will be noted that the upper edges of the side members 1b and 1c extend upwardly some distance past the upper edges of the ends and partition 1h. These curved upper edges 1f, 1g, 1i and 1j turn the contents of the receptacle with the movement of the paddle members 2, 3, 4 and 5 causing portions of the contents to turn upside-down and therefore provide additional mixing of the contents of the receptacle and also prevent slopping out at the ends, and the extended side members 1b and 1c prevent slopping over at the corners.

The shiftable paddle members 2, 3, 4 and 5 rest on the bottom 1a and are guided thereby and the ends rest against the side members 1b and 1c and are guided thereby. The upper corners of said paddle members are curved at 2b, as shown best in Fig. 3, to provide more clearance for the contents at the ends to prevent the contents slopping over, and each paddle member may be provided with holes 2c therethrough, as shown in Fig. 3. The members 2 and 3 are connected by means of a bar 6 and the members 4 and 5 are connected by means of a bar 7, and the bars 6 and 7 are connected by a bar 8, all as shown in the drawing.

It will be here noted that the shiftable paddle members 2 and 3 are adapted to reciprocate between the partition or stationary paddle member 1h and the end 1e, while the paddles 4 and 5 are adapted to reciprocate between the partition or stationary paddle 1h and the end 1d, and all connected together and bridged by the bar 8 over the partition 1h. This assembly of shiftable paddle members is reciprocated by means of a pitman member 9 which is provided with a vertical portion 9a which is slightly tapered and fits into a hole 8a in the enlarged portion of the member 8 and then extends downwardly into an enlarged portion 2a of the paddle member 2, as shown best in Fig. 1 of the drawing, thus providing considerable length of bearing and extending down to near the middle portion of the paddle members assembly and thus preventing tilting of the paddle members while they are reciprocating. This pitman member 9 is provided with a pitman head 9b which fits on a lug 10a on the crank wheel 10. The crank wheel 10 is mounted on a shaft 11 which shaft is revolved by any mechanical means, such as a motor, not shown. The crank wheel 10 and shaft 11 are supported by means of a support 12 which is secured to one end of the receptacle 1 by means of threaded lugs 12a and wing nuts 12b. The support 12 is provided with a right angle turn 12c at its upper end which forms the support for the wheel 10 and shaft 11.

Though I have shown and described a particular construction, combination and arrangement of parts and portions, I do not wish to be limited to this particular construction, combination and arrangement but desire to include in the scope of my invention the construction, combination and arrangement substantially as set forth in the appended claims.

Having thus described my invention, what I claim as new and desire to secure by Letters Patent is:

1. In an ice cream making attachment for mechanical refrigerators, a freezing receptacle consisting of a box like member open at its upper side and provided with inturned portions at the upper edge of its ends, a transverse partition extending across said receptacle at the middle and provided with oppositely disposed turns at its upper edge forming separate compartments in said receptacle, a pair of shiftable paddle members in each compartment, each shiftable paddle member being wholly vertical to its full height and resting on the bottom of said receptacle and wholly supported by said bottom, said shiftable paddle members being less in height than said receptacle and a single bridge connecting said pairs of paddle members only and raised to pass over said partition.

2. In an ice cream making attachment for mechanical refrigerators, a freezing receptacle consisting of a box like member open at its upper side and provided with inturned portions at the upper edge of its ends, a transverse partition extending across said receptacle at the middle and provided with oppositely disposed turns at its upper edge forming separate compartments in said receptacle, a pair of shiftable paddle members in each compartment, each shiftable paddle member being wholly vertical to its full height and resting on the bottom of said receptacle and wholly supported by said bottom, said shiftable paddle members being less in heighth than said receptacle, a single bridge connecting said pairs of paddle members only and raised to pass over said partition, crank wheel and pitman means for reciprocating said shiftable paddle members connected therewith through said bridge.

3. In an ice cream making attachment for mechanical refrigerators, a freezing receptacle provided with a transverse partition therein provided with oppositely disposed curved portions at its upper edge, shiftable paddle members mounted in said freezing receptacle on opposite sides of said partition wholly supported by the bottom of said receptacle and raised bridge means connecting said shiftable paddle members on opposite sides of said partition and extending over said partition, and crank wheel and pitman means connected with said bridge for reciprocating said shiftable paddle members.

RALPH D. LACOE.